(12) United States Patent
LeJars et al.

(10) Patent No.: US 8,162,597 B2
(45) Date of Patent: Apr. 24, 2012

(54) STAGE OF VARIABLE-PITCH VANES FOR A TURBOMACHINE

(75) Inventors: Claude Robert Louis LeJars, Draveil (FR); Richard Staessen, Chailly en Biere (FR)

(73) Assignee: SNECMA, Paris (FR)

( * ) Notice: Subject to any disclaimer, the term of this patent is extended or adjusted under 35 U.S.C. 154(b) by 862 days.

(21) Appl. No.: 12/197,695

(22) Filed: Aug. 25, 2008

(65) Prior Publication Data

US 2009/0087304 A1    Apr. 2, 2009

(30) Foreign Application Priority Data

Aug. 30, 2007  (FR) ..................... 07 06075

(51) Int. Cl.
*F01D 17/12* (2006.01)
(52) U.S. Cl. .............. 415/160; 415/229; 415/209.3; 411/337
(58) Field of Classification Search .......... 384/428, 384/296, 906, 435; 415/150, 155, 159, 160, 415/189, 209.3, 217, 207, 229; 310/60 A, 310/90, 92, 411
See application file for complete search history.

(56) References Cited

U.S. PATENT DOCUMENTS

| 4,498,790 | A | 2/1985 | Fisher |
| 4,808,069 | A | 2/1989 | Bonner et al. |
| 4,815,933 | A | 3/1989 | Hansel et al. |
| 7,125,222 | B2 * | 10/2006 | Cormier et al. ............... 415/160 |
| 2004/0081554 | A1 * | 4/2004 | Bruce ........................ 415/160 |
| 2004/0109762 | A1 | 6/2004 | Hidalgo et al. |
| 2007/0059161 | A1 * | 3/2007 | Bouru ........................ 415/160 |

FOREIGN PATENT DOCUMENTS

| EP | 0 388 285 A1 | 9/1990 |
| EP | 0 780 545 A1 | 6/1997 |
| EP | 1 586 744 A2 | 10/2005 |
| EP | 1 635 039 A1 | 3/2006 |
| FR | 2 874 977 A1 | 3/2006 |

* cited by examiner

*Primary Examiner* — Steven Loke
*Assistant Examiner* — Victoria Hall
(74) *Attorney, Agent, or Firm* — Oblon, Spivak, McClelland, Maier & Neustadt, L.L.P.

(57) ABSTRACT

A stage of variable-pitch vanes for a turbomachine is disclosed. The vanes include internal pivots engaged in corresponding housings of a sectorized internal ring. Each ring sector includes axial orifices for mounting two pins for the radial retention of the ring sector on the internal pivot of a vane. Each pin includes an immobilization device cooperating by shape coupling with a complementary immobilization device of the other pin in order to rotationally immobilize these pins in the orifices in the ring sectors.

8 Claims, 2 Drawing Sheets

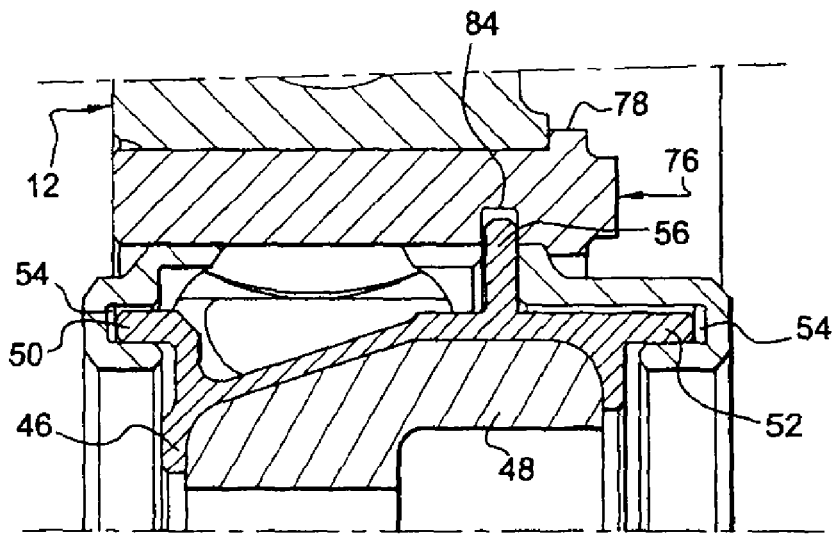
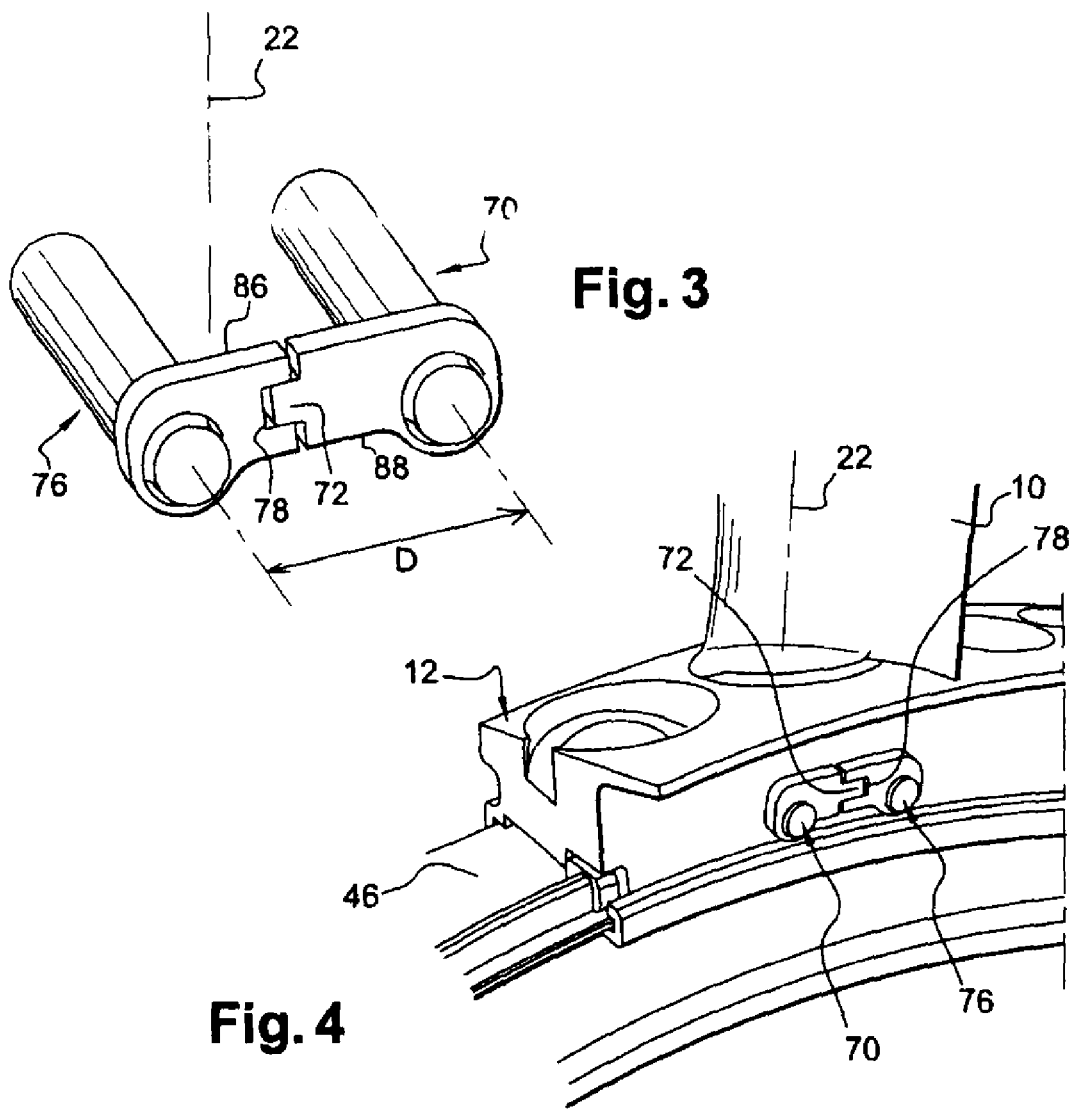

STAGE OF VARIABLE-PITCH VANES FOR A TURBOMACHINE

The present invention relates to a stage of variable-pitch vanes for a turbomachine such as an aircraft turbojet or turboprop.

BACKGROUND OF THE INVENTION

In a turbomachine, stages of variable-pitch vanes are mounted between rotor disks of a high-pressure compressor. These variable-pitch vanes are carried by the stator and can be adjusted in position about their axes in order to optimize the flow of gases into the engine of the turbomachine.

A variable-pitch vane comprises an axial cylindrical pivot at each of its ends, these pivots defining the axis of rotation of the vane. The radially external pivot, termed actuating pivot, is engaged in a cylindrical duct of a casing of the turbomachine and is connected by a connecting rod to an actuating ring operated by a ram or an electric motor. The rotation of the actuating ring is transmitted by the connecting rods to the external pivots of the vanes and causes them to turn about their axes.

The radially internal pivot, termed guide pivot, is engaged in a cylindrical housing of a sectorized internal ring. Each ring sector is maintained radially on vanes by at least two cylindrical pins engaged in axial orifices in the ring sector, these pins being parallel to one another and extending on either side of the pivot of a vane while passing into an external annular groove in this pivot. The cylindrical pins housed in the grooves in the pivots maintain the ring sectors radially on these pivots.

The ring is mounted at its internal periphery on a sectorized annular shroud comprising blocks of abradable material intended to cooperate with seal teeth provided on the rotor of the turbomachine in order to limit the passage of air in the axial direction inside the ring. The shroud comprises a radially external annular rib engaged in an annular channel opening toward the inside of the ring sectors in order to align these ring sectors with one another. The rib of the shroud is also engaged in transverse notches in the cylindrical pins in order to maintain these pins axially in the orifices in the ring sectors.

In operation, during the rotation of a variable-pitch vane about its axis, the internal pivot of this vane is caused to rub against the cylindrical pins situated on either side of this pivot, thus resulting in unwanted rotational movements of the pins about their axes. These unwanted movements combine with the vibrations of the engine and cause wear on the rib of the shroud as a result of the bottoms of the notches in the cylindrical pins rubbing and bearing against this rib. When the degree of wear on this rib has exceeded a certain threshold, it is required to replace the annular shroud, which is a long and costly operation.

SUMMARY OF THE INVENTION

A particular object of the invention is to provide a simple, effective and economic solution to this problem.

Accordingly, the invention provides a stage of variable-pitch vanes for a turbomachine, these vanes comprising radially external pivots engaged in radial ducts of an external casing and radially internal pivots engaged in corresponding housings of a sectorized internal ring, each ring sector comprising axial orifices for mounting at least two pins for the radial retention of the ring sector on the internal pivot of at least one vane, these pins being parallel and extending on either side of the internal pivot of the vane while passing into an external annular groove in this pivot, wherein each pin comprises means cooperating by shape coupling with complementary means of the other pin in order to rotationally immobilize these pins in the orifices in the ring sectors.

According to the invention, the two pins for the radial retention of a ring sector are mutually rotationally immobilized about their axes, thus preventing the pins from rubbing and bearing against the rib of the shroud, which means that said shroud has a longer service life than in the prior art. In the event of appreciable wear on the means for rotationally immobilizing the pins, all that is required is to replace these pins, and no longer the shroud as in the prior art, which is simple and more economic.

The rotational immobilization means are preferably formed on the heads of the pins. The head of one of the pins comprises, for example, at least one finger which extends transversely with respect to the axis of the pin and which is housed in a corresponding notch in the periphery of the head of the other pin.

Advantageously, each ring sector comprises orifices for mounting two pins at each of its circumferential ends, the two pins mounted at one circumferential end of the ring sector extending on either side of the internal pivot of one vane, and the two pins mounted at the other circumferential end of the ring sector extending on either side of the internal pivot of another vane.

The invention also relates to pins for a stage of variable-pitch vanes as described above, each pin comprising a cylindrical body connected at one end to a head extending transversely with respect to the axis of the pin, the head of one of the pins comprising a finger intended to cooperate with a notch of complementary shape formed in the head of another pin.

The invention additionally relates to a high-pressure compressor of a turbomachine, which comprises at least one stage of variable-pitch vanes as described above.

The invention finally relates to a turbomachine, such as an aircraft turbojet or turboprop, which comprises at least one stage of variable-pitch vanes of the aforementioned type.

BRIEF DESCRIPTION OF THE DRAWINGS

The invention will be better understood and other features, details and advantages of the invention will become apparent on reading the following description given by way of nonlimiting example and with reference to the appended drawings, in which:

FIG. 2 is a partial schematic view in axial section of an internal ring of a stage of variable-pitch vanes, this ring being equipped with pins according to the invention;

FIG. 3 is a schematic perspective view of a set of pins according to the invention; and FIG. 4 is a partial schematic perspective view of the internal ring equipped with the pins according to the invention.

DESCRIPTION OF THE PREFERRED EMBODIMENTS

Figure 1:
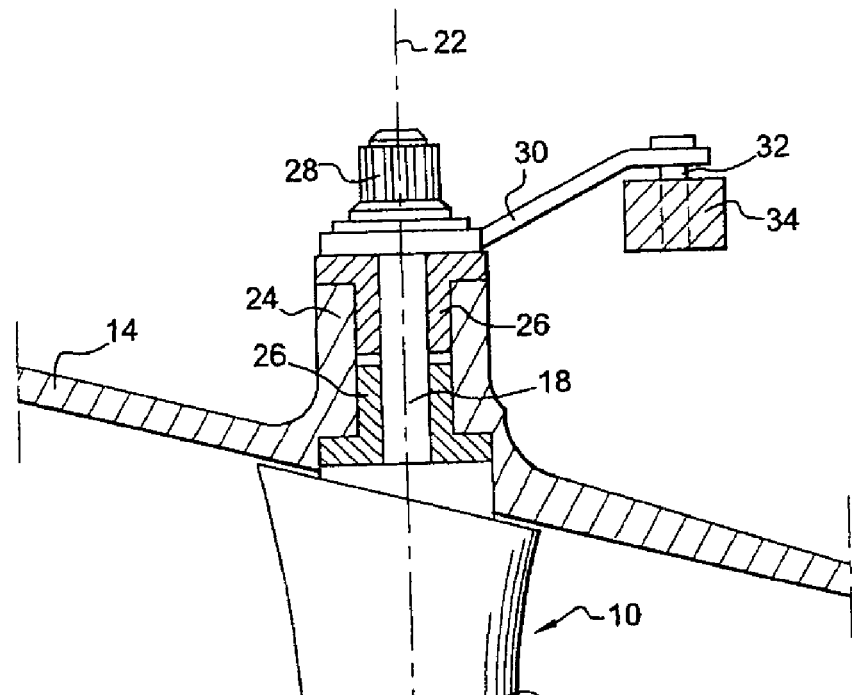
FIG. 1 is a schematic half-view in axial section of a stage of variable-pitch vanes of a high-pressure compressor of a turbomachine, according to the prior art.

FIG. 1 shows a stage of variable-pitch vanes 10 of a high-pressure compressor of a turbomachine, these vanes 10 being uniformly distributed around the axis of the turbomachine and extending between a sectorized internal ring 12 and an external casing 14 of the turbomachine.

Each vane 10 comprises an airfoil 16 connected at each of its radially internal and external ends to a radial cylindrical pivot 18, 20 which extends along the axis 22 of rotation of the vane.

The external cylindrical pivot 18, or actuating pivot, is engaged in a cylindrical duct 24 of the casing and is centered and rotationally guided in this duct by two identical cylindrical bushes 26 mounted in a mutually inverted arrangement around the external pivot 18.

The radially external end of the external pivot 18 is threaded and fastened by means of a nut 28 to one end of an actuating lever 30. The other end of the actuating lever 30 carries a finger 32 which is crimped onto this end of the lever and is rotationally guided in an actuating ring 34 which extends around the axis of the turbomachine, outside the casing 14. An angular movement of the actuating ring 34 about the axis of the turbomachine results in a rotation of the actuating levers 30 about the axes 22 and in the variable-pitch vanes 10 being rotated about these axes.

The internal cylindrical pivot 20, or guide pivot, is engaged in a cylindrical housing of the internal ring 12 and is centered and rotationally guided in this housing by a cylindrical sleeve 36. This sleeve 36 is provided at its radially external end with an external annular rim 40 which is maintained radially clamped between the radially internal end of the airfoil 16 of the vane and an annular shoulder of the ring 12.

The internal pivot 20 of the vane comprises an external annular groove 42 formed facing two diametrically opposed through openings formed in the cylindrical wall of the sleeve 36, these openings being situated to the front and rear of the plane of the drawing shown in FIG. 1, which means that they cannot be seen in this figure.

In a variant, the external annular groove 42 is formed in a cylindrical bush shrink-fitted onto the internal pivot 20 of the vane and engaged in the guide sleeve 36.

The internal ring 12 is sectorized and each ring sector comprises a plurality of radial cylindrical housings for receiving the internal pivots of vanes. An internal ring 12 is, for example, composed of eight ring sectors which each comprise eight or nine of these housings.

Each ring sector is maintained radially on the corresponding vanes by at least two cylindrical pins 44 which are engaged in axial orifices in the ring sector that are situated on either side of a vane pivot 20. These two pins are likewise situated to the front and rear of the plane of the drawing shown in FIG. 1. These pins are parallel and extend through the openings in the sleeve 36 and through the annular groove 42 in the pivot 20 in order to maintain the ring sector radially on the pivot of the vane. Each pin comprises a cylindrical body terminated at one end by a flat head extending transversely with respect to the longitudinal axis of the pin.

At its radially internal end, the internal ring 12 carries a likewise sectorized annular shroud 46 at whose internal periphery are fastened blocks 48 of abradable material which are intended to cooperate with radial seal teeth of a rotor (not shown) of the turbomachine in order to limit the passage of air axially from upstream to downstream inside the internal ring.

The shroud sectors 46 comprise upstream circumferential rims 50, oriented in the upstream direction, and downstream circumferential rims 52, oriented in the downstream direction, which are engaged in corresponding annular grooves 54 provided at the upstream and downstream ends, respectively, of the sectors of the internal ring 12.

The shroud sectors 46 additionally comprise a radially external annular rib 56 engaged in an annular channel 58 opening toward the inside of the ring sectors 12 in order to align the ring sectors with one another. The radially external end of this rib 56 is likewise engaged in transverse notches 60 in the bodies of the cylindrical pins 44 in order to maintain the pins 44 axially in the orifices in the ring sectors 12.

During the rotational movement of a vane 10 about its axis 22, the internal pivot 20 of this vane moves rotationally about this axis in the sleeve 36 and rubs against the cylindrical pins 44. The upstream and downstream walls of the notches 60 in the pins 44 are caused to butt against the walls of the rib which face them, and the lateral ends of the bottoms of these notches 60 are caused to butt against the external periphery of the rib, thus resulting in accelerated wear on the shroud and in a reduction of its service life.

The invention makes it possible to overcome these problems by virtue of indexing means formed on one of the two pins and intended to cooperate by shape coupling with complementary means formed on the other pin in order to rotationally immobilize these pins about their axes when setting the angular pitch of the corresponding vane and during the operation of the turbomachine.

In the exemplary embodiment represented in FIGS. 2 to 4, the immobilizing means comprise a finger 72 carried by the head of a first pin, and a notch 78 formed at the periphery of the head of the second pin 76, this notch having a shape which complements that of the finger of the first pin. The finger 72 and the notch 78 are each formed by a transverse continuation of the head of the pin. Each pin and its immobilizing means are formed in one piece.

As in the prior art, the two pins 70, 76 are mounted in orifices in a ring sector 12 and extend parallel to one another and on either side of the internal pivot 20 of a variable-pitch vane 10 (FIG. 4).

The distance D in the circumferential direction between the axes of the pins can vary with the diameter of the pins. This distance D preferably differs from one stage to the other in the compressor of the turbomachine, thereby preventing cylindrical pins reserved for one stage of the compressor from being mounted on another stage of this compressor. The distance D may also be identical in all the stages of the compressor so as to have only a single reference for a set of cylindrical pins, and to simplify the provision of these pins. By way of example, the distance D between the axes of the pins is between 5 and 10 mm approximately, the diameters of the pins varying, for example, from 5 to 7 mm approximately.

The pins 70, 76 which are rotationally immobilized about their axes are blocked axially by the annular rib 56 of the shroud 46 that passes into the transverse notches 84 formed in the bodies of the pins. The axial clearance between the rib 56 and the notches 84 in the pins can be optimized to limit the axial movements of the pins in the orifices in the ring sectors 12.

Moreover, the angular position of the immobilizing means 72, 78 on the heads of the pins is determined such that, in the mounting position, the notches 84 in the pins are aligned with one another in the circumferential direction.

The heads of the pins 70, 76 can additionally comprise means for indicating the angular position of the notches 84 in the bodies of the pins in order to prevent improper mounting of the pins in the orifices in the ring sectors. In the example represented, the heads of the pins each comprise a straight lateral edge 86 and a lateral edge 88 having a concave curved portion indicating that the notch 84 is situated directly behind this edge 88 and that, in the mounting position, this edge 88 is intended to be oriented toward the inside such that the notch 84 opens toward the inside.

Each ring sector preferably comprises orifices for mounting two pins at each of its circumferential ends. The pins mounted at one circumferential end of the ring sector cooperate with the internal pivot of one vane, and the pins mounted at the other circumferential end of the ring sector cooperate with the internal pivot of another vane in order to maintain this ring sector radially on these vanes.

Each sector of the internal ring is mounted in the following way: the ring sector is moved radially from the inside toward the outside until the internal pivots 20 of the vanes of this sector are engaged in the sleeve 36 and in the cylindrical housings of the ring sector. A set of two pins is mounted at each circumferential end of the ring sector, each pin being engaged axially from the downstream direction in an orifice in the ring sector while passing through the openings in the sleeve 36 and through the groove 42 in the internal pivot 20, until the head of the pin bears axially against the ring sector. For each set of pins, the finger 72 of the first pin 70 is fitted into the notch 78 in the second pin 76 such that the notches 84 of the pins are aligned with one another and open radially toward the inside. A shroud sector 46 is then mounted at the internal periphery of the ring sector 12 by engaging the circumferential rims 50, 52 of the shroud sector in the annular grooves 54 in the ring sector and by sliding the ring sector and the shroud sector on one another in the circumferential direction, until the rib 56 of the shroud sector is engaged in the notches 84 in the pins 70, 76. The shroud and ring sectors can have identical or different dimensions in the circumferential direction.

Of course, the invention is not limited to the embodiment which has been described in the foregoing and represented in the appended drawings. It would, for example, be possible for other forms to be given to the means 72, 78 for immobilizing the pins. It would also be possible to form the pin and its immobilizing means as two independent parts and to attach and fasten these immobilizing means to the pin.

The invention claimed is:

1. A stage of variable-pitch vanes for a turbomachine, these vanes comprising radially external pivots engaged in radial ducts of an external casing and radially internal pivots engaged in corresponding housings of a sectorized internal ring, said sectorized internal ring having ring sectors each comprising axial orifices for mounting at least two pins for the radial retention of the ring sector on the internal pivot of a vane, the pins being parallel and extending on opposite sides of the internal pivot of the vane while passing into an external annular groove in the internal pivot, wherein each pin comprises a cylindrical body terminated at one end by a head, said cylindrical body of each pin comprising a transverse notch and said head of each pin comprising means cooperating by shape coupling with complementary means of the other pin in order to rotationally immobilize these pins in the orifices in the ring sectors, and said head of each pin comprising means for indicating the angular position of the transverse notch in the cylindrical body of the pin.

2. The stage of variable-pitch vanes as claimed in claim 1, wherein the head of one of the pins comprises at least one finger which extends transversely with respect to a longitudinal axis of the pin and which is housed in a corresponding notch formed at a periphery of the head of the other pin.

3. Pins for a stage of variable-pitch vanes as claimed in claim 1, each pin comprising a cylindrical body connected at one end to a head extending transversely with respect to the axis of the pin, the head of a first pin comprising a finger intended to cooperate with a notch of complementary shape formed in the head of a second pin, said cylindrical body of each pin comprising a transverse notch and said head of each pin comprising means for indicating the angular position of the transverse notch in the cylindrical body of the pin.

4. A high-pressure compressor of a turbomachine, which comprises at least one stage of variable-pitch vanes as claimed in claim 1.

5. A turbomachine comprising at least one stage of variable-pitch vanes as claimed in claim 1.

6. The stage of variable-pitch vanes as claimed in claim 1, wherein the head of each pin comprises a straight lateral edge and a lateral edge having a concave curved portion indicating that the transverse notch is situated directly behind the lateral edge having the concave curved portion.

7. The stage of variable-pitch vanes as claimed in claim 1, wherein the ring sector carries a shroud having an external rib, said transverse notches of the cylindrical bodies of the pins being configured to receive said external rib, and wherein the heads of the pins are configured to be in abutment against a lateral face of the ring sector when the external rib of the shroud sector is received in the transverse notches of the cylindrical bodies of the pins.

8. The stage of variable-pitch vanes as claimed in claim 6, wherein the lateral edge having the concave curved portion is oriented radially inside of the straight lateral edge such that the transverse notch opens in a radially inside direction.

* * * * *